United States Patent
Wang et al.

(10) Patent No.: US 10,787,231 B2
(45) Date of Patent: Sep. 29, 2020

(54) SYSTEMS, METHODS, AND APPARATUSES FOR REDUCING HYDRODYNAMIC FRICTIONAL DRAG

(71) Applicant: California Institute of Technology, Pasadena, CA (US)

(72) Inventors: Cong Wang, Pasadena, CA (US); David Jeon, Pasadena, CA (US); Morgane Grivel, Pasadena, CA (US); Francisco Pereira, Rome (IT); Morteza Gharib, Altadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 15/663,595

(22) Filed: Jul. 28, 2017

(65) Prior Publication Data
US 2018/0229808 A1 Aug. 16, 2018

Related U.S. Application Data

(60) Provisional application No. 62/444,897, filed on Jan. 11, 2017, provisional application No. 62/382,523, (Continued)

(51) Int. Cl.
*F15C 1/08* (2006.01)
*B63B 1/38* (2006.01)
(Continued)

(52) U.S. Cl.
CPC ............ *B63B 1/38* (2013.01); *C09D 5/1618* (2013.01); *C09D 5/1637* (2013.01);
(Continued)

(58) Field of Classification Search
CPC ........ F15D 1/003; F15D 1/0055; F15D 1/008; F15D 1/0085; F15D 1/06; F15D 1/12;
(Continued)

(56) References Cited

U.S. PATENT DOCUMENTS

| | | | | |
|---|---|---|---|---|
| 5,171,623 A | * | 12/1992 | Yee | ........................... B63B 1/34 114/288 |
| 5,193,530 A | * | 3/1993 | Gamow | .................. B63C 11/14 128/201.27 |

(Continued)

OTHER PUBLICATIONS

Carlborg, C.F., et al., "Continuous Flow Switching by Pneumatic Actuation of the Air Lubrication Layer on Superhydrophobic Microchannel Walls", IEEE 21st International Conference on Micro Electro Mechanical Systems, 2008, pp. 599-602.

(Continued)

*Primary Examiner* — Minh Q Le
(74) *Attorney, Agent, or Firm* — One LLP (57) ABSTRACT

Systems, methods and apparatuses are provided for the reduction of hydrodynamic frictional drag. These systems, methods and apparatuses can include a vessel surface having an external layer and a plurality of dimples, wherein the external layer comprises a hydrophilic material, and wherein each of the dimples includes an inner surface having a superhydrophobic coating. The dimples can be configured to maintain an air-water interface as one or more fluids flow over the vessel surface. In some embodiments, a pressure reservoir can be coupled with the dimples, and can include an acoustic speaker to vibrate the air-water interface.

14 Claims, 11 Drawing Sheets

Related U.S. Application Data filed on Sep. 1, 2016, provisional application No. 62/368,769, filed on Jul. 29, 2016.

(51) Int. Cl.

| F15D 1/12 | (2006.01) |
|---|---|
| F15D 1/06 | (2006.01) |
| C09D 5/16 | (2006.01) |
| F15D 1/00 | (2006.01) |

(52) U.S. Cl.
CPC ............ *C09D 5/1681* (2013.01); *F15D 1/005* (2013.01); *F15D 1/007* (2013.01); *F15D 1/065* (2013.01); *F15D 1/12* (2013.01); *B63B 2001/387* (2013.01); *Y02T 70/122* (2013.01)

(58) Field of Classification Search
CPC .. F15D 1/065; B63B 1/38; B63B 1/34; B63B 2001/387; C09D 5/1618; C09D 5/1637; C09D 5/1681; B64C 2230/08; B64C 2230/16; B64C 2230/22; B64C 2230/24
USPC ................................................ 137/825, 827
See application file for complete search history.

(56) References Cited

U.S. PATENT DOCUMENTS

| 8,256,846 | B2* | 9/2012 | Yoon | F16L 9/006 |
| | | | | 114/243 |
| 8,671,862 | B2 | 3/2014 | Wu et al. | |
| 2002/0062778 | A1* | 5/2002 | Barker | B63B 21/663 |
| | | | | 114/253 |
| 2003/0070682 | A1* | 4/2003 | Wilson | A61F 2/2412 |
| | | | | 128/207.16 |
| 2006/0058837 | A1* | 3/2006 | Bose | A61B 17/22 |
| | | | | 606/200 |
| 2006/0251859 | A1* | 11/2006 | D'Urso | B63B 1/34 |
| | | | | 428/141 |
| 2007/0193726 | A1* | 8/2007 | Vida | F15D 1/065 |
| | | | | 165/133 |
| 2007/0269658 | A1* | 11/2007 | Kondos | C09D 163/00 |
| | | | | 428/413 |
| 2010/0108813 | A1 | 5/2010 | Lang | |
| 2010/0166964 | A1* | 7/2010 | Go | F15D 1/10 |
| | | | | 427/290 |
| 2010/0309560 | A1* | 12/2010 | Dharmatilleke | G02B 3/14 |
| | | | | 359/666 |
| 2010/0330340 | A1 | 12/2010 | Rothstein et al. | |
| 2013/0032316 | A1* | 2/2013 | Dhiman | B08B 17/065 |
| | | | | 165/133 |
| 2014/0277070 | A1* | 9/2014 | Otero | A61B 17/12186 |
| | | | | 606/194 |
| 2014/0318657 | A1* | 10/2014 | Bixler | F15D 1/003 |
| | | | | 138/39 |
| 2015/0017385 | A1* | 1/2015 | Lang | F15D 1/003 |
| | | | | 428/141 |
| 2015/0047765 | A1* | 2/2015 | Vo | B32B 37/24 |
| | | | | 156/60 |
| 2015/0083227 | A1* | 3/2015 | Bidkar | C23C 4/18 |
| | | | | 137/1 |
| 2015/0273791 | A1* | 10/2015 | Schimmel | F15D 1/008 |
| | | | | 156/60 |
| 2015/0275078 | A1* | 10/2015 | Vo | C09K 11/703 |
| | | | | 252/301.36 |
| 2016/0251606 | A1* | 9/2016 | Peirsman | B65D 81/266 |
| | | | | 99/277 |
| 2017/0028362 | A1* | 2/2017 | Stasiak | B01D 67/0027 |
| 2017/0181260 | A1* | 6/2017 | Corke | H05H 1/2406 |
| 2018/0148038 | A1* | 5/2018 | Ulrey | B60W 20/15 |
| 2018/0320717 | A1* | 11/2018 | Xu | F15D 1/003 |
| 2018/0362118 | A1* | 12/2018 | Barthlott | B63B 1/38 |
| 2019/0142266 | A1* | 5/2019 | Casarotto | A61B 17/22031 |
| | | | | 600/105 |

OTHER PUBLICATIONS

Carlborg, C.F., et al., "Microchannels With Substantial Friction Reduction At Large Pressure and Large Flow", IEEE 22nd International Conference on Micro Electro Mechanical Systems, 2009, pp. 39-42.

Ferrante, A., et al., "On the physical mechanisms of drag reduction in a spatially developing turbulent boundary layer laden with microbubbles", J. Fluid Mech., 2004, vol. 503, pp. 345-355.

Fu, Y.F., et al., "Marine drag reduction of shark skin inspired riblet surfaces", Biosurface and Biotribology, 2017, vol. 3, pp. 11-24.

Fuaad, P.A., et al., "Drag-reduction in buoyant and neutrally-buoyant turbulent flows over super-hydrophobic surfaces in transverse orientation", Intl. J. Heat Mass Trans., 2016, vol. 93, pp. 1020-1033.

Lee, C., et al., "Underwater Restoration and Retention of Gases on Superhydrophobic Surfaces for Drag Reduction", Phys. Rev. Lett., 2011, vol. 106, pp. 1-16.

Madavan, N. K., et al., "Reduction of turbulent skin friction by microbubbles", Phys. Fluids, 1984, vol. 27, No. 2, pp. 356-363.

Madavan, N. K., et al., "Measurements of local skin friction in a microbubble-modified turbulent boundary layer", J. Fluid Mech., 1985, vol. 156, pp. 237-256.

Wang, B., et al., "Investigation of retention of gases in transverse hydrophobic microgrooved surfaces for drag reduction", Ocean Engineering, 2014, vol. 79, pp. 58-66.

* cited by examiner

SYSTEMS, METHODS, AND APPARATUSES FOR REDUCING HYDRODYNAMIC FRICTIONAL DRAG

CROSS-REFERENCE TO RELATED APPLICATIONS

This application claims priority to U.S. Provisional Application Ser. No. 62/368,769, filed Jul. 29, 2016; U.S. Provisional Application Ser. No. 62/382,523, filed Sep. 1, 2016; and U.S. Provisional Application Ser. No. 62/444,897, filed Jan. 11, 2017, all of which are hereby expressly incorporated by reference in their entirety for all purposes.

STATEMENT REGARDING FEDERALLY SPONSORED RESEARCH OR DEVELOPMENT

This invention was made with government support under Grant Nos. N00014-11-1-0031 and N00014-15-1-2479, awarded by the Office of Naval Research. The government has certain rights in the invention.

FIELD OF INVENTION

The subject matter described herein relates to systems, methods, and apparatuses for reducing hydrodynamic frictional drag. In particular, provided herein are embodiments which include a vessel surface having an external layer and a plurality of dimples, wherein the external layer comprises a hydrophilic material, and wherein each of the plurality of dimples includes an internal surface having a superhydrophobic coating.

BACKGROUND

The reduction of hydrodynamic frictional drag is a long-standing challenge faced by engineers and designers from a variety of industries, ranging from marine vessels (e.g., ships, sailboats, and submarines) to fluid networks (e.g., water supply systems). In these fields and others, there continues to be a strong and growing need to develop methods to reduce hydrodynamic drag by controlling and manipulating the laminar and turbulent boundary layers. These methods have the potential to save millions of dollars in fuel costs for large ocean-faring vessels, as one example, or to improve energy efficiency in hydraulic pumping systems, as another example. Similarly, systems, methods, and apparatuses for reducing hydrodynamic drag are in high demand for sport boats, such as the yachts used in the America's Cup.

Air lubrication has been used in various forms to reduce hydrodynamic frictional drag. In some prior systems, for example, air bubbles have been injected along the hull of a marine vessel. Air bubbles in the boundary layer have been known to reduce hydrodynamic drag. In practice, however, the pumping cost in generating the quantity of bubbles needed for drag reduction essentially eliminates any savings due to drag reduction. To reduce pumping costs, some have tried creating and maintaining an air film, for example, by trapping air in a cavity on the surface of the marine vessel. However, large cavities of air are typically unstable and will quickly lose air. As a result, the need to continuously pump more air into the cavities results in inefficiencies.

Some researchers have attempted to utilize superhydrophobic coatings to trap air along a vessel surface, and thus reduce hydrodynamic drag. However, those air bubbles trapped on the surface are quickly swept away by the turbulent boundary layer as forces on the protruding bubbles overwhelm the surface tension forces holding the bubble to the vessel wall.

Accordingly, there is a present need for systems, methods, and/or apparatuses for efficiently reducing hydrodynamic frictional drag.

SUMMARY

Described herein are example embodiments of systems, methods, and apparatuses for reducing hydrodynamic frictional drag. These embodiments can operate by maintaining a stable air-water interface over a vessel surface having a plurality of dimples. In many of the embodiments, the vessel surface can include an external layer comprising a hydrophilic material, while each of the plurality of dimples include an internal surface having a superhydrophobic coating. According to one aspect of these embodiments, an air-water interface is maintained over the dimpled surface thereby reducing hydrodynamic frictional drag. Additionally, in some embodiments, the air-water interface can be vibrated by an acoustic wave or a pressure wave, which can manipulate and/or maintain the turbulent boundary layer formed over the surface.

Other systems, devices, methods, features and advantages of the subject matter described herein will be or will become apparent to one with skill in the art upon examination of the following figures and detailed description. It is intended that all such additional systems, devices, methods, features and advantages be included within this description, be within the scope of the subject matter described herein, and be protected by the accompanying claims. In no way should the features of the example embodiments be construed as limiting the appended claims, absent express recitation of those features in the claims.

BRIEF DESCRIPTION OF THE DRAWINGS

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

DETAILED DESCRIPTION

Before the present subject matter is described in detail, it is to be understood that this disclosure is not limited to the particular embodiments described, as such may, of course, vary. It is also to be understood that the terminology used herein is for the purpose of describing particular embodiments only, and is not intended to be limiting, since the scope of the present disclosure will be limited only by the appended claims.

As used herein and in the appended claims, the singular forms "a," "an," and "the" include plural referents unless the context clearly dictates otherwise.

The systems, methods, and apparatuses described herein relate to the reduction of hydrodynamic frictional drag. Accordingly, in many of the embodiments disclosed herein, a vessel surface having an external layer and a plurality of dimples is provided, in which the external layer comprises a hydrophilic material and the inner surface of each dimple includes a superhydrophobic coating. Each dimple in the plurality of dimples can be configured to maintain an air bubble within as one or more fluids flow over the vessel surface. In some embodiments, each of the plurality of dimples can have a hexagonal cross section. However, other configurations and geometries for the dimples can be utilized with the embodiments described herein.

In many of the embodiments, a pressure reservoir is also provided. The pressure reservoir can be configured to supply or replenish air to the dimples, maintain or change the shape of the air-water interface over the plurality of dimples or vibrate the air-water interface to provide further drag reduction. In some embodiments of the present disclosure, the pressure reservoir can also include an acoustic speaker configured to vibrate the air-water interface at a predetermined signal frequency and/or a predetermined amplitude. Furthermore, according to many of the embodiments, each of the dimples are coupled to the pressure reservoir by an air channel through which air and sound can be conducted.

Before describing more particular aspects of the embodiments in detail, however, it is first desirable to describe examples of devices that can be present within, for example, a system for hydrodynamic frictional drag reduction, as well as examples of their operation, all of which can be used with the embodiments described herein.

Example Embodiment of System for Hydrodynamic Frictional Drag Reduction

Figure 1:
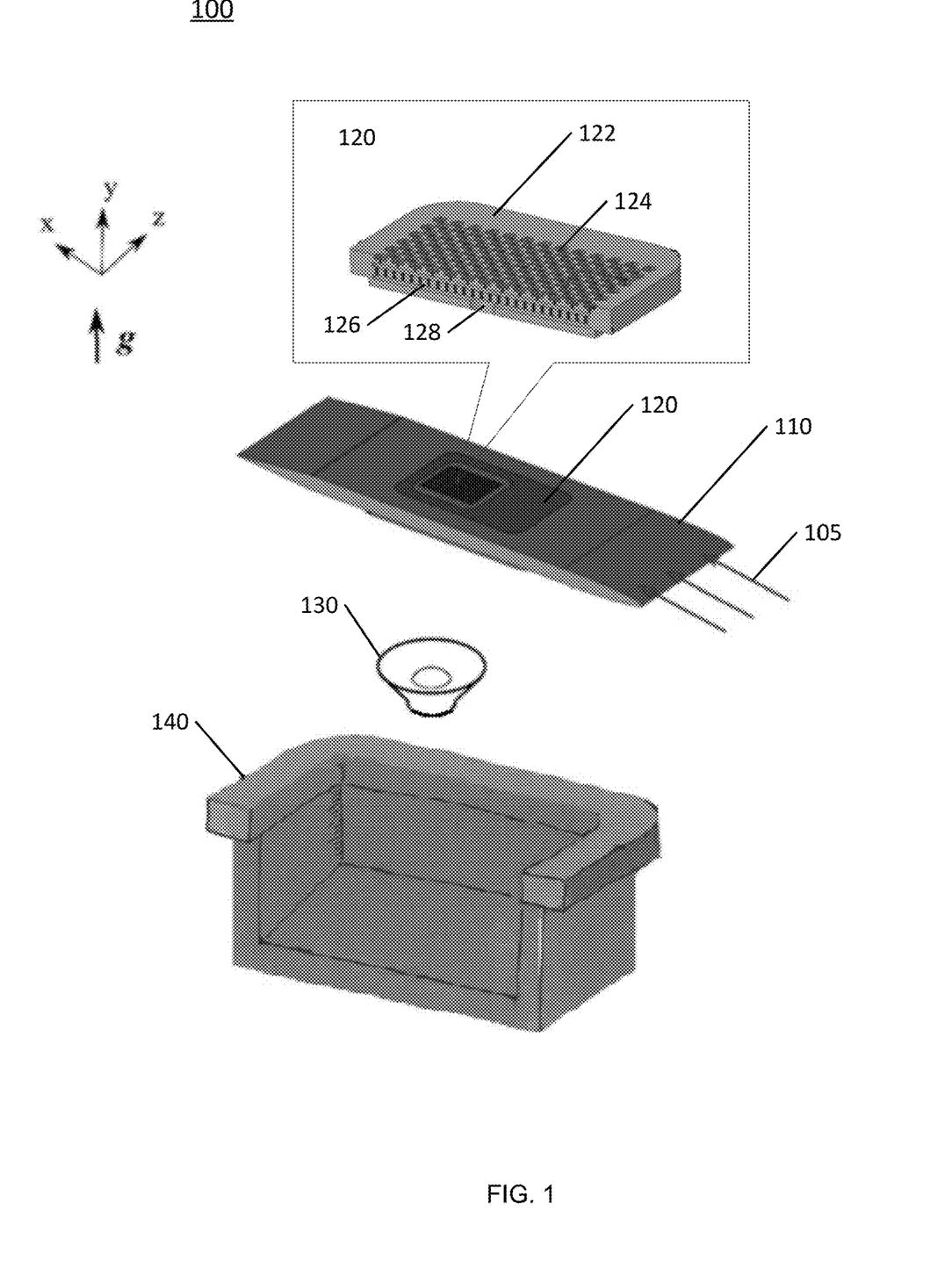
FIG. 1 is a partially exploded and cross-sectional system overview of an example embodiment of a system for reducing hydrodynamic frictional drag.

FIG. 1 is a partially exploded and cross-sectional system overview of an example embodiment of system 100 for reducing hydrodynamic frictional drag, which can be used with the embodiments of the present disclosure. As can be seen on the left, x, y, and z axes are provided for reference, along with gravitational direction, g. According to FIG. 1, system 100 includes a vessel surface 110 for interfacing with one or more fluids flowing across vessel surface 110, as indicated by directional arrows 105. As can be seen in the call-out, vessel surface 110 can include at least a portion 120 having an external layer 122 and a plurality of dimples 124. As seen in FIG. 1, external layer 122 is shown as a substantially flat surface. In other embodiments, however, external layer 122 can have other surface shapes and configurations, such as that of a curved or a wavy surface. In certain alternative embodiments, external layer 122 can also include in addition to, or in the alternative to, the plurality of dimples, a series of patterned bands in a longitudinal or diagonal direction, similar to those described below with respect to FIGS. 9A to 9C.

Figure 2A:
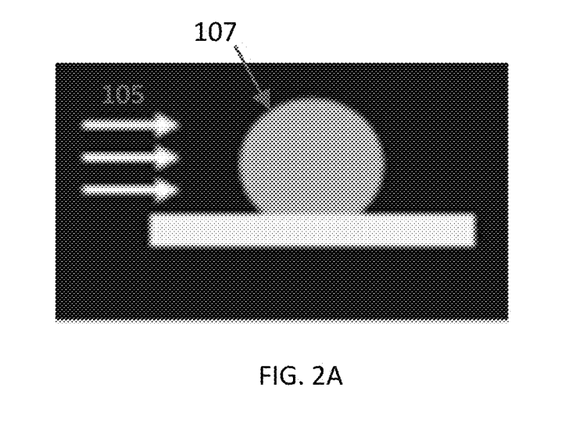
FIGS. 2A and 2B are diagrams illustrating shear forces on an air bubble against a flat surface and against a dimpled surface, respectively.
Figure 2B:
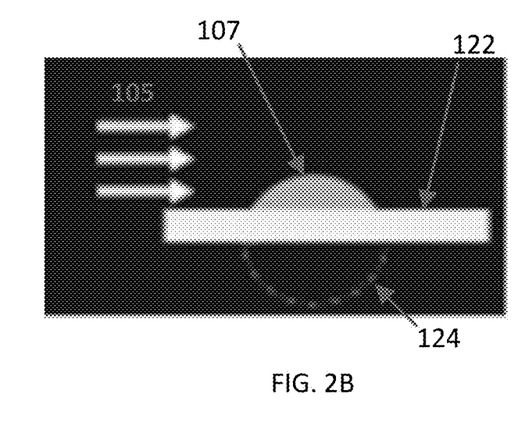

According to many of the embodiments disclosed herein, the plurality of dimples 124 provides for reduced shear force upon the air-water interface. As best seen in FIGS. 2A and 2B, two diagrams are provided to illustrate this principle. As seen in FIG. 2A, due to the exposed surface area of the air-water interface of bubble 107, which, in this case, is positioned against a flat continuous surface, the flow of the one or more fluids 105 imparts a relatively large shear force, which, in turn, increases the likelihood that the bubble will escape from the surface. By contrast, as seen in FIG. 2B, shear forces from the flow of the one or more fluids 105 imparts a relatively smaller shear force when bubble 107 is seated or partially contained within dimple 124. This is, in part, due to the fact that there is less surface area of the air-water interface exposed to the fluid flow. Accordingly, it is more likely that the air-water interface is stable and bubble 107 will remain in dimple 124.

According to another aspect of the embodiment, as stated above, each of the plurality of dimples 124 includes an inner surface having a superhydrophobic coating. In some embodiments, for example, the superhydrophobic coating can comprise a manganese oxide polystyrene nano-composite, zinc oxide polystyrene nano-composite, calcium carbonate, carbon nano-tube structures, or silica nano-coating. In other embodiments, the internal surface of each dimple can be made superhydrophobic through the engineering of micro or nanoscale structures on the internal surface, such as, for example, riblets, posts or breaker ridges. Those of skill in the art will appreciate that these examples are not meant to be exhaustive or limiting in any way, and that other types of superhydrophobic coatings and/or macro-, micro- or nano-structures having superhydrophobic properties, which can be applied to the internal surface of each dimple, are fully within the scope of the present disclosure.

Referring again to FIG. 1, according to another aspect of the embodiment, each of the plurality of dimples 124 is adapted to maintain an air bubble within or approximately within the dimple 124, as one or more fluids 105 flow over vessel surface 110. In some embodiments, each dimple 124 can have a hexagonal cross section, as described below with respect to FIG. 8A. In other embodiments, however, dimple 124 can have a circular, pentagonal, octagonal, or decagonal cross section. Those of skill in the art will recognize that other geometries can be utilized for the cross section of dimple 124. As the one or more fluids 105 flow over vessel surface 110, because external layer 122 comprises a hydrophilic material and the inner surface of each dimple 124 includes a superhydrophobic coating, air can become trapped in each of the plurality of dimples 124, and can also be highly resistant to the turbulence in the boundary layer. In addition, according to another aspect of the embodiment, because dimples 124 can be relatively small in size (i.e., approximately the same size as air bubbles in water), the air-water film can be relatively stable compared to, for example, a larger air-water interface in a structure having a much larger opening. Thus, due to a combination of the differential surface properties (i.e., dimple 124 having a superhydrophobic coating and external layer 122 comprising a hydrophilic material) and the size and geometry of dimple 124, air bubbles can be trapped and maintained with relative stability within dimple 124, as the one or more fluids 105 flow across vessel surface 110. By contrast, if both the inner surface of dimple 124 and external layer 122 were hydrophobic, then the air bubble would easily escape from dimple 124 onto external layer 122, since no barrier is present at the edge of the dimple 124 to prevent the air bubble from sliding out.

Referring again to FIG. 1, according to another aspect of the embodiment of system 100, each of the dimples 124 is coupled to a pressure reservoir 140 by an air channel 126. In some embodiments, the individual air channels 126 coupled to each of the dimples 124 can merge into a central air channel 128 leading into the pressure reservoir 140. Pressure reservoir 140 is configured to maintain the air-water interface over the plurality of dimples 124 by supplying air to the dimple 124 if there is air loss due to diffusion or turbulent fluctuation. In some embodiments, pressure reservoir 140 can also be used to maintain or deform the air-water interface. For example, and as best seen in FIG. 3B, by adjusting the chamber pressure in the pressure reservoir 140, the air-water interface can be configured to be flat, bulged into the fluid flow 105, or sagged inside dimple 124.

According to another aspect of the embodiment of system 100, it has been observed that surface friction can be reduced by vibrating the air-water interface over dimples 124. In many embodiments, vibrational behavior of the air-water interface over dimples 124 can be actively controlled by controlling the pressure inside pressure reservoir 140. In addition, in some embodiments, pressure reservoir 140 can also include an acoustic speaker 130, which can be configured to generate and output an acoustic wave to vibrate the air-water interface over dimples 124. In these embodiments, speaker 130 can provide desired pressure fluctuations by controlling the signal frequency and amplitude. In addition, in some embodiments, acoustic speaker 130 and pressure inside the pressure reservoir 140 can be controlled by electronics housed inside the or adjacent to the pressure reservoir, as will be described in further detail with respect to FIG. 10.

Example Embodiment of Vessel Surface Portion with Plurality of Dimples

Figure 3A:
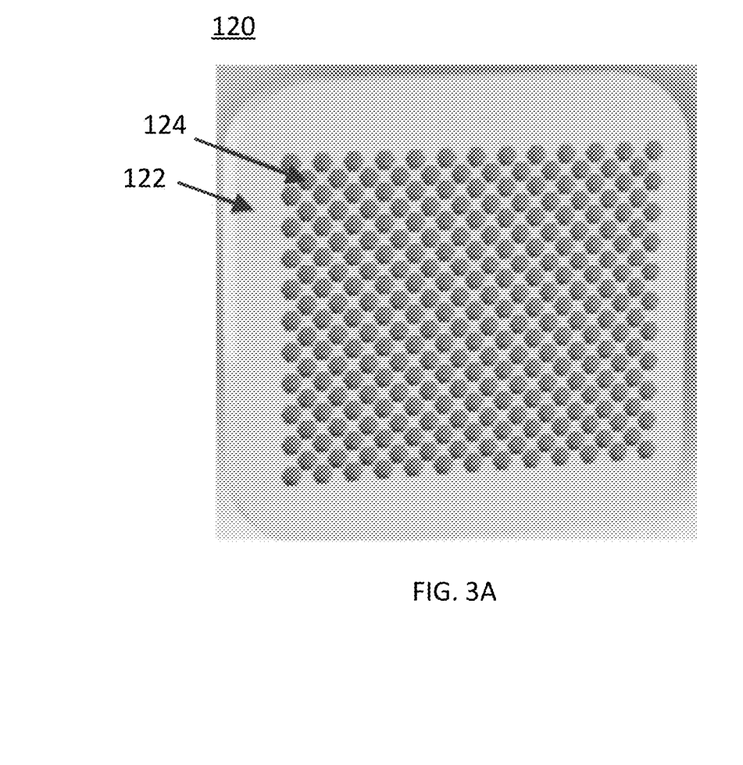
FIGS. 3A and 3B are a front view and a diagrammatic side view, respectively, of an example embodiment of a surface having a plurality of dimples.
Figure 3B:
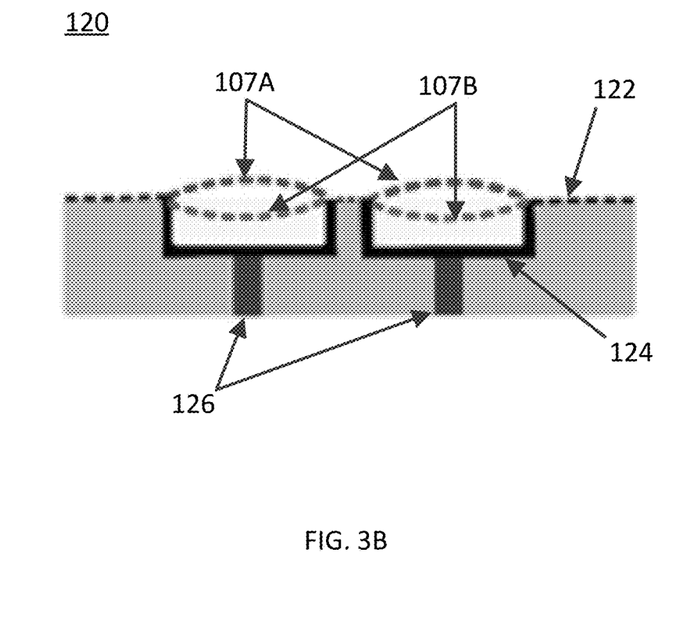

Turning to FIGS. 3A and 3B, a front view and a diagrammatic side view are provided, respectively, of one example embodiment of a vessel surface portion 120 from a system for reducing hydrodynamic frictional drag. Referring to FIG. 3A, a frontal view of vessel surface portion 120 is shown having an external layer 122 and plurality of dimples 124. Although each of the plurality of dimples is shown with a hexagonal cross section, those of skill in the art will recognize that other cross-sectional shapes and geometries for dimples 124 are possible. Similarly, although the plurality of dimples is arranged in a staggered pattern resembling a square, it will be appreciated by those of skill in the art that the overall configuration and density of the plurality of dimples can vary, and that other embodiments having a different overall configuration or density for the plurality of dimples are well within the scope of the present disclosure. As described earlier, in many of the embodiments disclosed herein, external layer 122 comprises a hydrophilic material, while the inner surface of each dimple 124 includes a superhydrophobic coating.

Referring to FIG. 3B, a diagrammatic side view of vessel surface portion 120 is shown, including two dimples 124, as well as external layer 122. Air channels 126 are also shown at the bottom of each of the two dimples 124. As described earlier, air channels 126 can be coupled to a pressure reservoir (not shown), and used to replenish the air in the dimple 124, to modulate pressure inside the dimple 124, or to carry acoustic soundwaves from a speaker in the pressure reservoir to actively vibrate the air-water interface (107A, 107B). According to FIG. 3B, the air-water interface is shown in two states: (i) a bulging interface 107A, where the air-water interface protrudes into the fluid flow, and (ii) a sagging interface 107B, where the air-water interface sags into the cavity of the dimple 124. In the embodiment shown in FIG. 3B, the center-bottom portion of dimple 124 is substantially flat. In other embodiments, dimple 124 can have a curved inner surface. For example, in some embodiments, dimple 124 can include an inner-bottom surface that is concave with the opening facing the external layer 122. In other embodiments, dimple 124 can have a conical inner surface with the apex of the conical surface at the bottom of the dimple. Those of skill in the art will appreciate that other configurations and geometries for the inner surface of dimples 124 are possible, and are fully within the scope of the present disclosure.

Figure 4A:
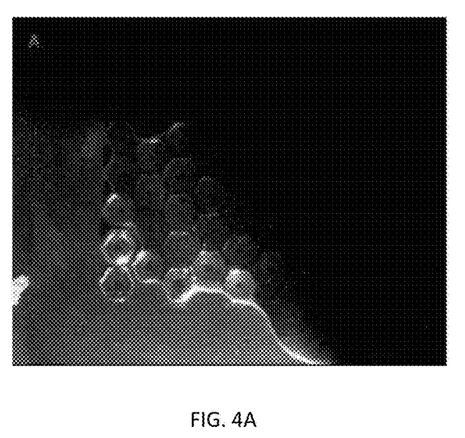
FIGS. 4A to 4D are chronological photographs depicting front views of an example embodiment of a surface having a plurality of dimples.
Figure 4B:
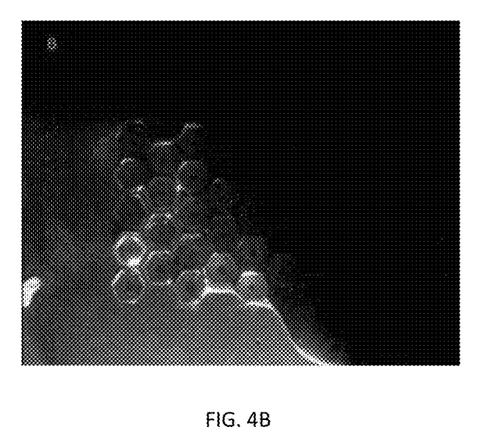
Figure 4C:
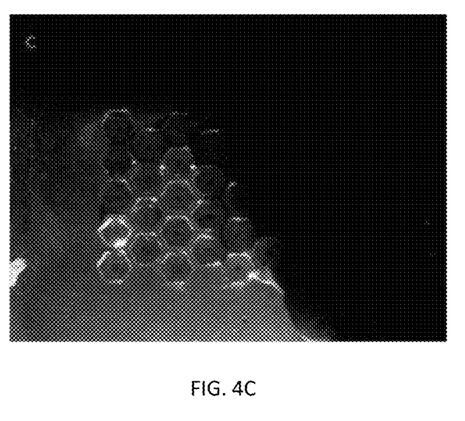
Figure 4D:
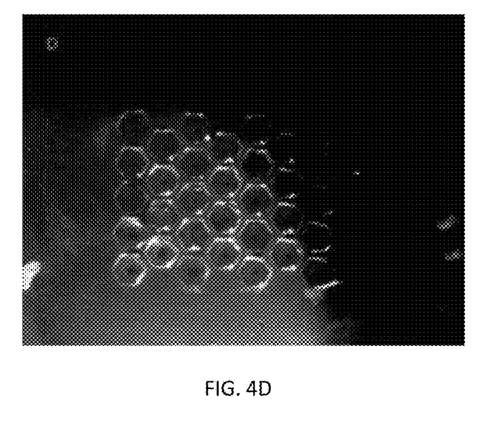

FIGS. 4A to 4D are photographs depicting front views of an example embodiment of a vessel surface portion having a plurality of dimples to illustrate the various states of the air-water interface as fluid flow is accelerated. As can be seen in FIG. 4A, a layer of air covers both the dimples 124 and the external layer 122 in static water. As fluid flow 105 begins and is accelerated, the air over the external layer 122 is gradually swept off by shear/turbulent flow, but the air inside dimples 124 stays with the vessel surface portion 120. As describe earlier, the air trapped inside dimples 124 forms an air-water interface, which vibrates under the action of a turbulent boundary layer, as can be seen in FIG. 4D.

Figure 5A:
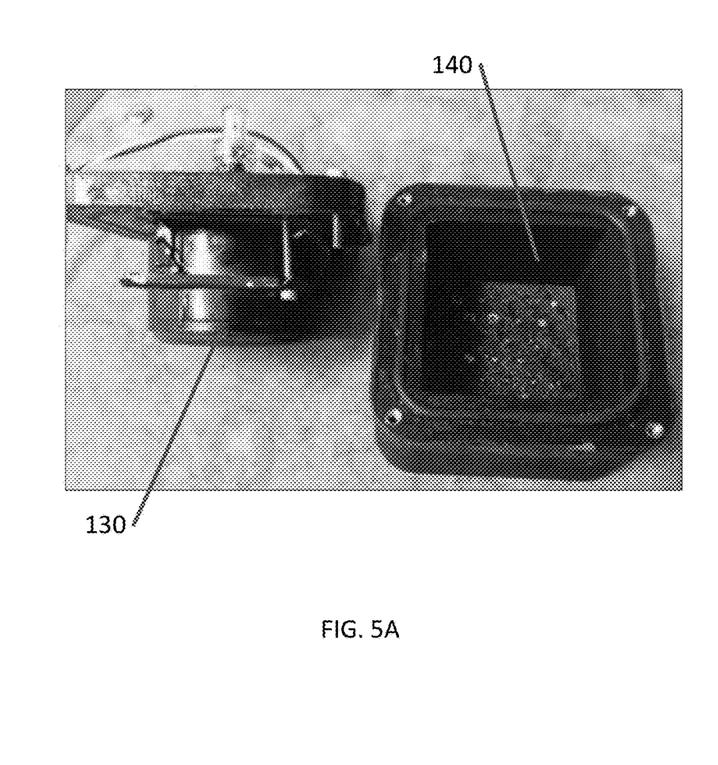
FIGS. 5A and 5B are photographs depicting back and front perspective views of an example embodiment of a system for reducing hydrodynamic frictional drag.
Figure 5B:
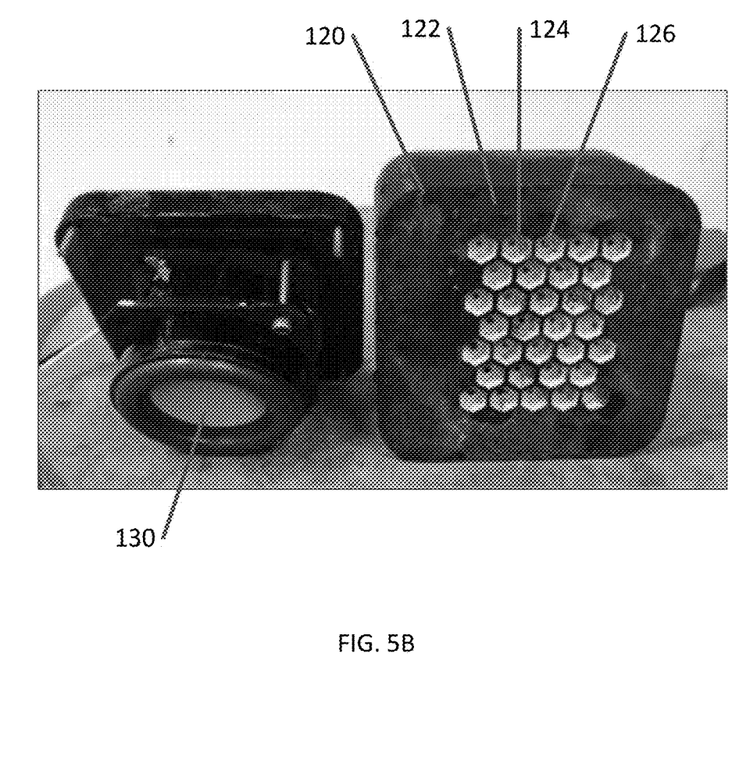

Example Embodiment of Vessel Surface Portion Including Pressure Reservoir and Speaker Turning to FIGS. 5A and 5B, photographs are provided depicting back and front perspective views, respectively, of an example embodiment of a vessel surface portion 120 including a pressure reservoir 140 and acoustic speaker 130. As seen in FIG. 5A, pressure reservoir 140 is shown as a box-like cavity behind vessel surface portion 120. As described earlier, pressure reservoir 140 can be configured to replenish air to the plurality of dimples 124, and furthermore, can be configured to modulate pressure in the cavity of dimple 124 in order to maintain or deform the air-water interface covering the plurality of dimples 124. In some embodiments, an acoustic speaker 130 is also provided, which can be disposed within the housing of pressure reservoir 140. Acoustic speaker 130 can be configured to vibrate the air-water interface according to a predetermined signal frequency and predetermined amplitude, which has been shown to reduce hydrodynamic frictional drag. According to one aspect of the embodiments disclosed herein, a range of effective frequency can be determined by a ratio of the turbulent flow free stream velocity over the turbulent boundary layer thickness (e.g., such as momentum thickness). As seen in FIG. 5B, acoustic speaker 130 can be disposed within the pressure reservoir 130 and configured to actively control air-water interface vibrations by generating and transmitting pressure fluctuations from the speaker 130 through air channels 126.

Figure 6A:
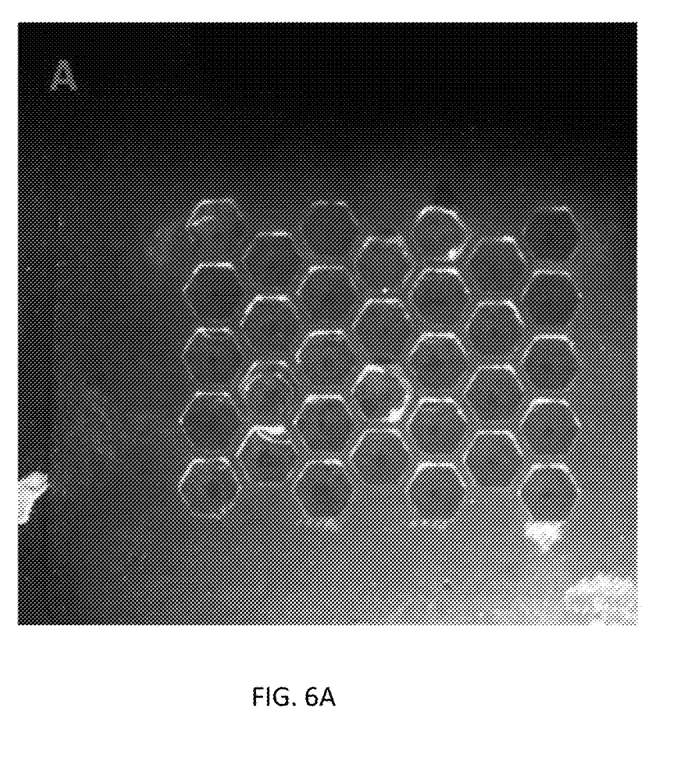
FIGS. 6A and 6B are photographs depicting example embodiments of a system for reducing hydrodynamic frictional drag.
Figure 6B:
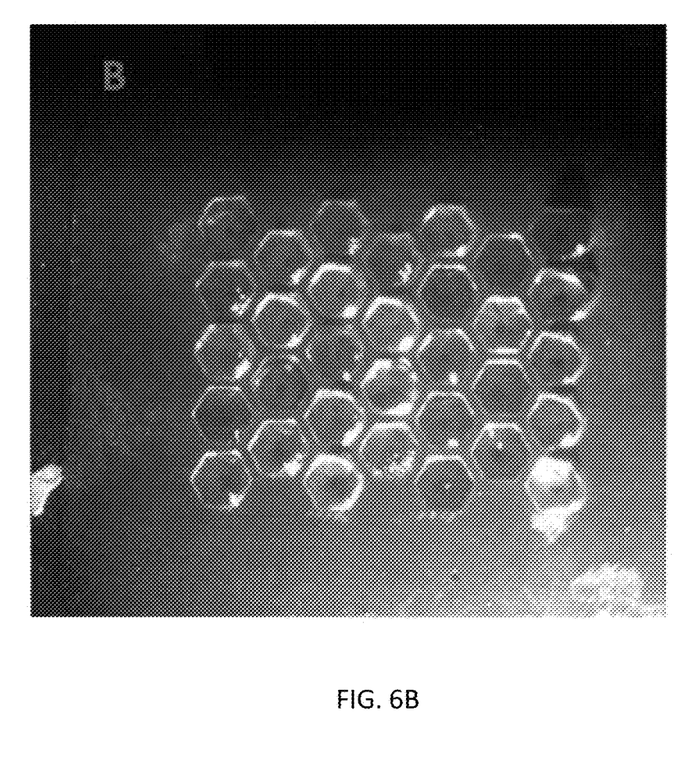

FIGS. 6A and 6B are photographs depicting front views of an example embodiment of a vessel surface portion to illustrate the various states of the air-water interface both with and without actuation from the acoustic speaker. FIG. 6A depicts the passive vibration behavior of the air-water interface. FIG. 6B depicts an air-water interface in the same turbulent boundary layer being actively vibrated under a 30 Hz beats signal.

Figure 7A:
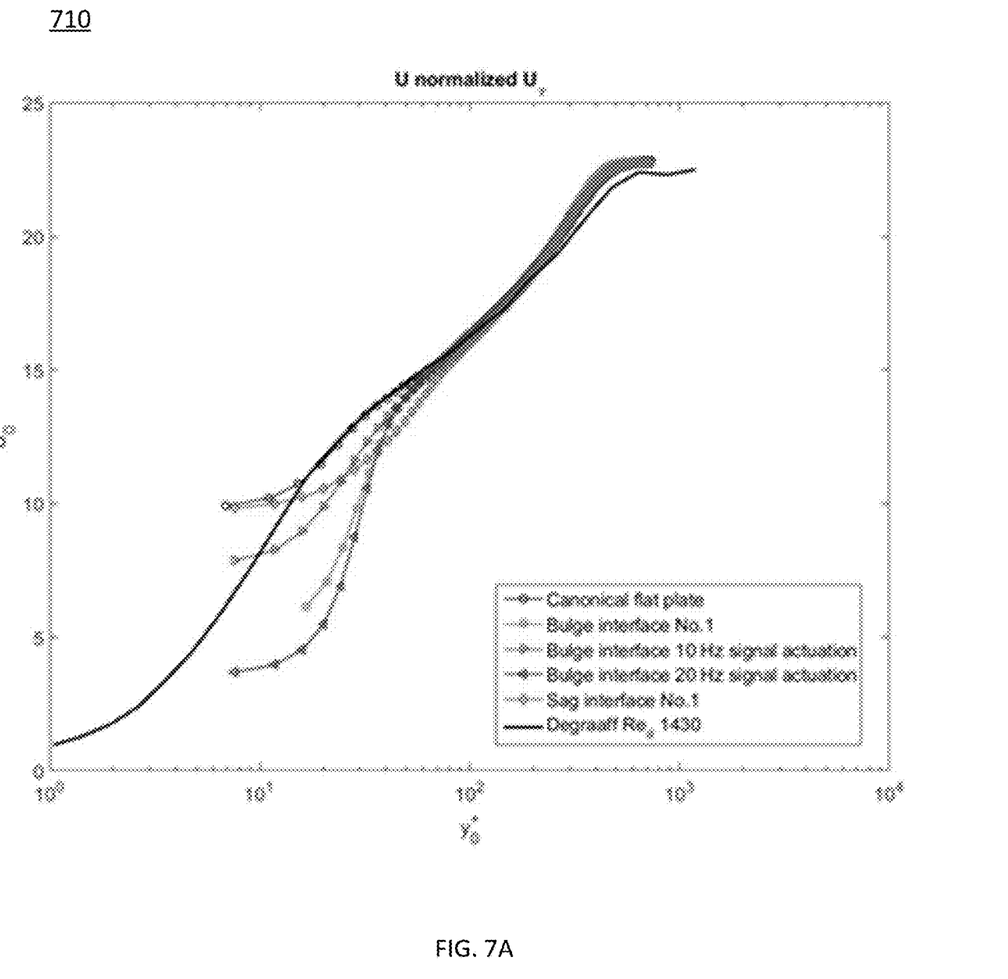
FIGS. 7A and 7B are graphs showing flow velocities relating to deformation of air-water interface for an example embodiment of a system for reducing hydrodynamic frictional drag.
Figure 7B:
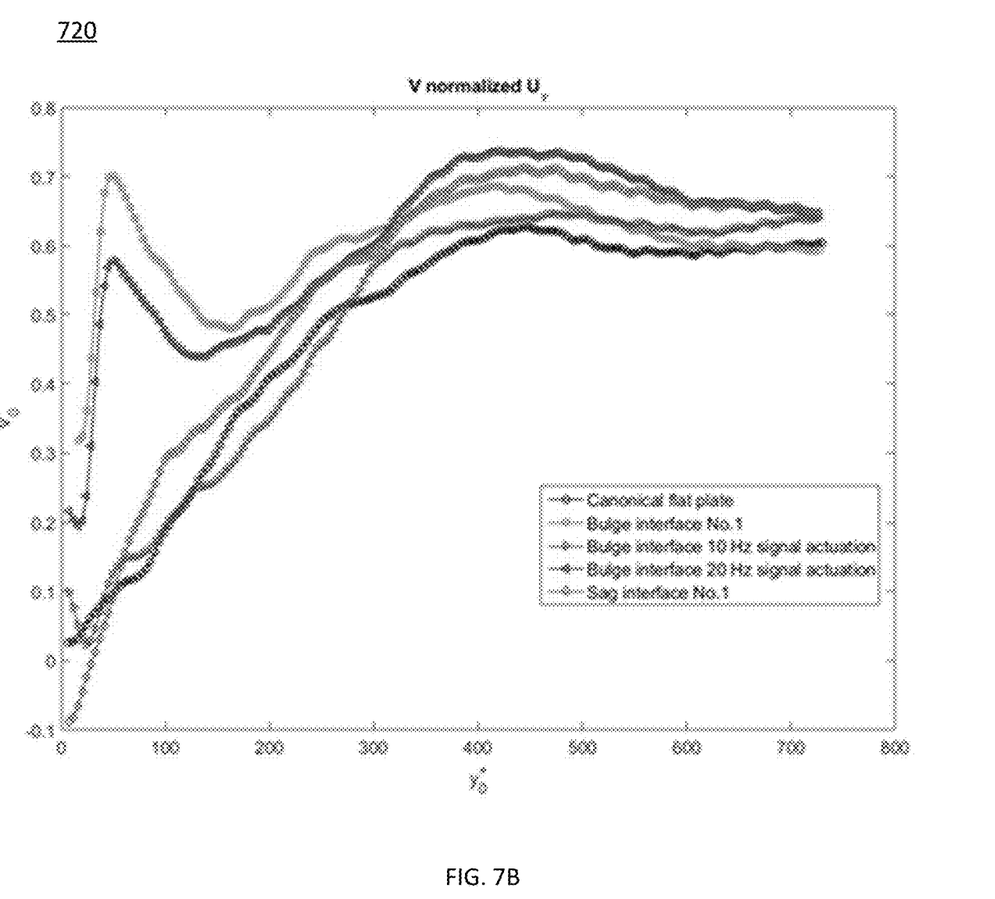

FIGS. 7A and 7B are graphs depicting flow velocities relating to various stages of deformation of air-water interface for an example embodiment of a system for reducing hydrodynamic frictional drag according to the disclosed embodiments. Using Particle Image Velocimetry (PIV) to measure flow velocity, data was obtained on the effect of deformation of the air-water interface. By adjusting chamber pressure in the pressure reservoir, the air-water interface was configured to be flat, bulged into flow, or sagged inside dimples. In addition, the air-water interface was actuated by a 10 Hz and a 20 Hz acoustic wave. (For purposes of the experiment, the magnitude of the acoustic wave was held constant.) During the experiment, it was observed that the air-water interface could deform passively by the turbulent boundary layer or actively by the acoustic wave. The bulged and sagged air-water interfaces could passively induce more deformation than the flat air-water interface. The tunnel speed was set to 0.54 meter per second, generating a fully turbulent boundary layer corresponding to a Reynolds number based on momentum thickness $Re_\theta=1350$. As can be seen in FIG. 7A, the PIV results demonstrated that the deformation of the air-water interface resulted in a slowing down of the x-velocity of flow. However, as can be seen in FIG. 7B, y-velocity increases as the air-water interface is deformed. The velocity profile is non-dimensionalized by the frictional velocity $U_\tau$ for the flat plate.

To evaluate the drag reduction effect, control volume analysis for momentum balance was carried out. The x-momentum loss over the dimpled surface was calculated and compared to the momentum loss over the canonical flat plate. The drag reduction rate (DR) is defined as the difference of the two x-momentum losses divided by the momentum loss over the canonical flat plate. The draft reduction performance for different cases is summarized below in Table 1.

TABLE 1

| Cases | Drag Reduction (%) |
|---|---|
| Bulged interface (No. 1) | 30 |
| Bulged interface (No. 2) | 35 |
| Flat interface (No. 1) | 17 |
| Sagged interface (No. 1) | 17 |
| Sagged interface (No. 2) | 11 |
| Sagged interface (No. 3) | 20 |
| Bulged interface (10 Hz actuation) | 15 |
| Bulged interface (20 Hz actuation) | 61 |

Table 1 illustrates that reduction in hydrodynamic frictional drag can occur under any deformation of the air-water interface, and suggests a minimum DR of 10% under the parameters of the experiment. Generally, the bulged air-water interface results in a greater drag reduction rate (~30%) than either of the flat or sagged air-water interface configurations (between 10% and 20%). These results suggest that not all kinds of air-water interface deformation perform equally well in reducing drag. Additionally, when the bulged interface is actuated by a 20 Hz signal, the drag reduction was calculated to be approximately 60%, which is much greater than the other cases. This suggests that the drag reduction performance can be significantly improved by the deformation frequency, e.g., by applying a specific frequency through the acoustic speaker.

Figure 8A:
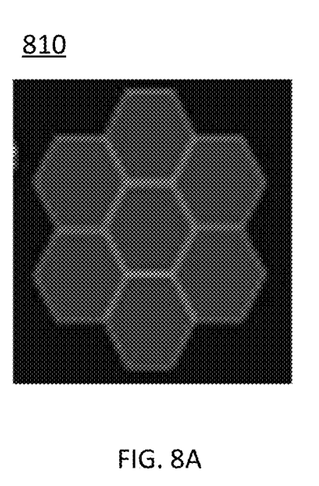
FIGS. 8A to 8D are diagrams illustrating various example dimple configurations for an example embodiment of a system for reducing hydrodynamic frictional drag.
Figure 8B:
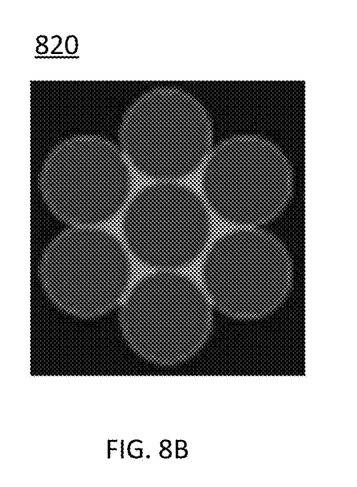
Figure 8C:
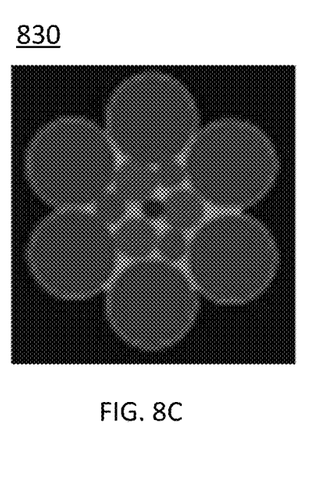
Figure 8D:
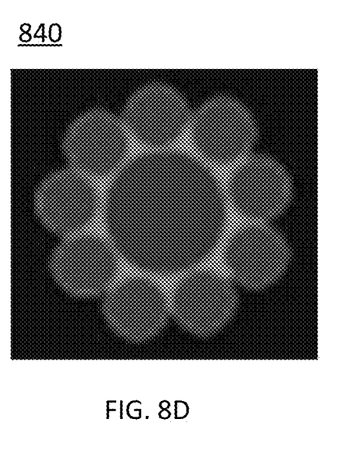

Example Embodiments of Dimples and Other Superhydrophobic Surface Configurations FIGS. 8A to 8D are diagrams illustrating various example dimple configurations for an example embodiment of a system for reducing hydrodynamic frictional drag. FIG. 8A depicts a hexagonal cross section of a dimple. According to some embodiments, the use of a hexagonal cross section can result in an improved fill factor, as compared to various circular dimple cross sections (FIGS. 8B to 8D), due to the hexagonal geometry allowing for more efficient surface packing, and also permitting for an increased percentage of surface covered by air rather than water. In particular, in certain embodiments, it was observed that hexagonal dimples exhibited at 63.6% fill factor, while circular dimples exhibited only a 56.6% fill factor. However, it was also observed that the use of hexagonal dimples resulted in more frequent bubble collapse.

In other embodiments, each of the plurality of dimples can have an elliptical, pentagonal, octagonal, or decagonal cross section. For example, in those embodiments where a vessel surface is curved (i.e., not substantially flat), each of the plurality of dimples can have a pentagonal cross section for close packing (i.e., having a pattern similar to that of a soccer ball). In other embodiments, cross sectional geometries can be mixed, i.e., comprise two or more different polygonal geometries, in order to optimize dimple density across a non-flat vessel surface. Those of skill in the art will recognize that other geometries and sizes can be utilized for the cross section of dimple based on other considerations. For example, the local boundary layer thickness provides the range for effective range of scales for dimple design. The dimple sizes in a single design can be varied to match the local boundary layer thickness (or momentum thickness). The dimple geometry and size as well as cavity volume can be designed to take advantage of Helmholtz Resonance frequency for effective maintenance of the air-water interface.

Figure 9A:
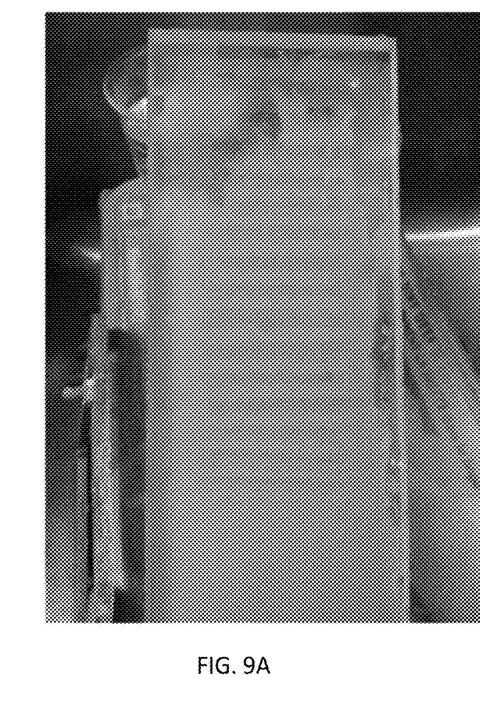
FIGS. 9A to 9C are photographs depicting an example embodiment of a system for reducing hydrodynamic frictional drag.
Figure 9B:
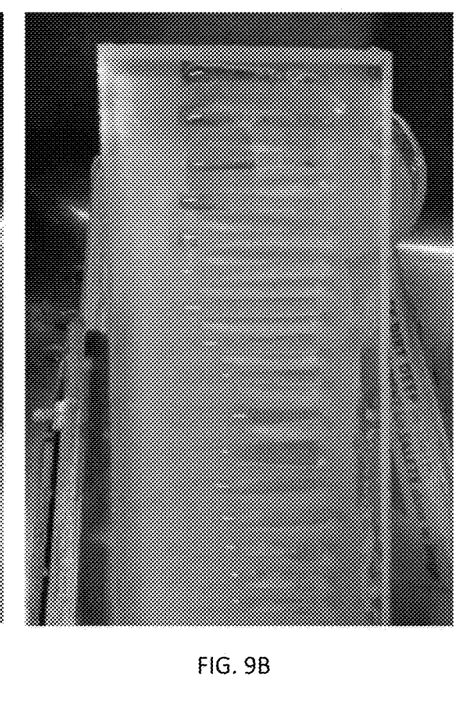
Figure 9C:
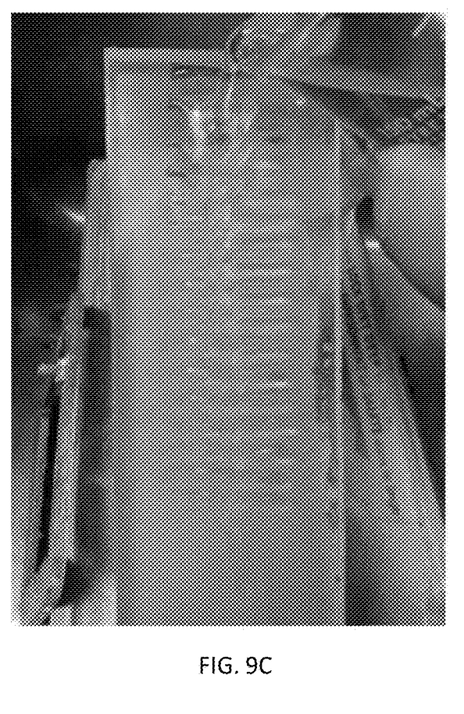

FIGS. 9A to 9C are photographs depicting an alternate example embodiment of a system for reducing hydrodynamic frictional drag. As shown in FIGS. 9A to 9C, spatially patterned hydrophobic and hydrophilic patches are provided in the form of bands, which can be utilized either in addition to, or in the alternative to, the aforementioned dimples. According to some embodiments, a special hydrophobic and/or hydrophilic coating can be applied to existing plates, which can be configured to direct the flow of fluid in a certain direction and reduce random turbulence energy loss. In certain embodiments, for example, the patterns can be designed as longitudinal or diagonal bands of predetermined width and spatial frequency in terms of variable hydrophilicity and hydrophobicity. The bands can be configured to interface with the flow of fluids and act as "riblets" to reduce turbulent drag. Moreover, by inducing extra momentum into the boundary layer through periodic and/or aperiodic patterns of hydrophilic and hydrophobic bands and patches, the separation of the boundary layer can be delayed and, thus, can consequently result in pressure drag reduction. According to one aspect of the embodiments, the patterns can be designed to create three-dimensional surface shear flows to cause local vorticity production similar to vortex generators used for separation control on finite aspect ratio wings and control surfaces.

Referring to FIGS. 9A to 9C, photographs of the embodiments are provided to illustrate how a surface with sharply defined regions of hydrophobicity and hydrophilicity can segregate water and air. FIG. 9A depicts a dry surface having spatially-patterned hydrophobic and hydrophilic patches in the form of bands. FIG. 9B depicts water trapped on the hydrophilic regions of the surface. FIG. 9C depicts how water interacts with the surface features when flowing over the hydrophobic and hydrophilic regions. According to one aspect of the embodiments, in submerged situations, the differential surface properties can cause an upward movement (with respect to the surface) of the boundary layer when fluid passes over hydrophobic surfaces, and relative downward motion as fluid passes over hydrophilic surfaces (as seen in FIG. 9C). At the boundary between the surface types, the flow receives an impulse, thus resulting in a controlled introduction of perturbation to the boundary layer. The process described herein is independent of Reynolds numbers, and therefore can be applicable to both laminar and turbulent flows.

Example Embodiments of Pressure Control Electronics Systems

Figure 10:
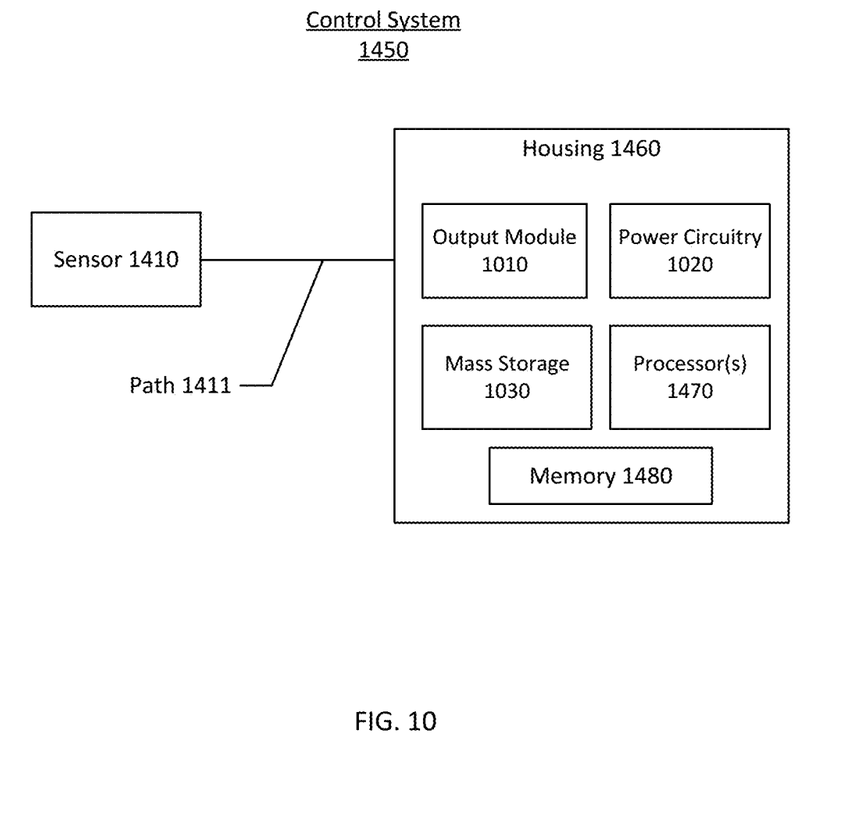
FIG. 10 is a block diagram depicting an example embodiment of an apparatus for reducing hydrodynamic frictional drag.

FIG. 10 is a block diagram of an example embodiment of electronics for a control system to be utilized with any of the embodiments for reducing hydrodynamic frictional drag disclosed herein. In some embodiments, control system 1450 can be a remote computing device, such as a desktop, laptop, workstation, server computer, smart phone, tablet computer or other mobile computing device. In other embodiments, control system 1450 can be fully or partially housed within the pressure reservoir. Control system 1450 can include one more processors 1470 which can comprise, for example, one or more of a general-purpose central processing unit ("CPU"), a graphics processing unit ("GPU"), an application-specific integrated circuit ("ASIC"), a field programmable gate array ("FPGA"), an Application-specific Standard Products ("ASSPs"), Systems-on-a-Chip ("SOCs"), Programmable Logic Devices ("PLDs"), or other similar components. Processors 220 can comprise one or more processors, microprocessors, controllers, and/or microcontrollers, or a combination thereof, wherein each component can be a discrete chip or distributed amongst (and a portion of) a number of different chips, and collectively, can have the majority of the processing capability for acquiring, validating and analyzing athletic movement data. Control system 1450 can also include memory 1480, which can comprise non-transitory memory, RAM, Flash or other types of memory; one or more mass storage units 1030; and power circuitry 1020, which can include a battery for storing power. Control system 1450 can also include an output module 1010, which can generate audio, visual and/or vibratory output such as, for example, outputting a graphical user interface to a connected display.

In certain embodiments, where control system 1450 is integrated with pressure reservoir, output module 1010 can also be configured to increase pressure to deform the air-water interface, to generate acoustic wave at a predetermined signal frequency and predetermined amplitude, and/or to replenish air to the dimple cavity be controlling a pump mechanism (not shown). In some embodiments, control system 1450 can also include a sensor 1410 connected to processor 1470 through path 1411. Sensor 1410 can be configured to sense the pressure in the pressure reservoir, to measure the flow velocity of the fluid passing over the vessel surface, or to measure acceleration of the vessel itself. In some embodiments sensor 1410 can include accelerometers, magnetometers, manometers, force sensors, pressure sensors and other like sensors. Those of skill in the art will understand that the aforementioned types of sensors are not meant to be limiting in any way, and other types of sensors are fully within the scope of the present disclosure.

Throughout this disclosure, the preferred embodiment and examples illustrated should be considered as exemplars, rather than as limitations on the present inventive subject matter, which includes many inventions. As used herein, the term "inventive subject matter," "system," "device," "apparatus," "method," "present system," "present device," "present apparatus" or "present method" refers to any and all of the embodiments described herein, and any equivalents.

It should also be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

When an element or feature is referred to as being "on" or "adjacent" to another element or feature, it can be directly on or adjacent the other element or feature or intervening elements or features may also be present. In contrast, when an element is referred to as being "directly on" or extending "directly onto" another element, there are no intervening elements present. Additionally, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Furthermore, relative terms such as "inner," "outer," "upper," "top," "above," "lower," "bottom," "beneath," "below," and similar terms, may be used herein to describe a relationship of one element to another. Terms such as "higher," "lower," "wider," "narrower," and similar terms, may be used herein to describe angular relationships. It is understood that these terms are intended to encompass different orientations of the elements or system in addition to the orientation depicted in the figures.

Although the terms first, second, third, etc., may be used herein to describe various elements, components, regions, and/or sections, these elements, components, regions, and/or sections should not be limited by these terms. These terms are only used to distinguish one element, component, region, or section from another. Thus, unless expressly stated otherwise, a first element, component, region, or section discussed below could be termed a second element, component, region, or section without departing from the teachings of the inventive subject matter. As used herein, the term "and/or" includes any and all combinations of one or more of the associated list items.

The terminology used herein is for the purpose of describing particular embodiments only and is not intended to be limiting. As used herein, the singular forms "a," "an," and "the" are intended to include the plural forms as well, unless the context clearly indicates otherwise. For example, when the present specification refers to "an" assembly, it is understood that this language encompasses a single assembly or a plurality or array of assemblies. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

Embodiments are described herein with reference to view illustrations that are schematic illustrations. As such, the actual thickness of elements can be different, and variations from the shapes of the illustrations as a result, for example, of manufacturing techniques and/or tolerances are expected. Thus, the elements illustrated in the figures are schematic in nature and their shapes are not intended to illustrate the precise shape of a region and are not intended to limit the scope of the inventive subject matter.

The foregoing is intended to cover all modifications, equivalents and alternative constructions falling within the spirit and scope of the invention as expressed in the appended claims, wherein no portion of the disclosure is intended, expressly or implicitly, to be dedicated to the public domain if not set forth in the claims. Furthermore, any features, functions, steps, or elements of the embodiments may be recited in or added to the claims, as well as negative limitations that define the inventive scope of the claims by features, functions, steps, or elements that are not within that scope.

What is claimed is:

1. A system for reducing hydrodynamic frictional drag, the system comprising:
   a vessel surface having an external layer and a plurality of dimples, wherein the external layer and an inner surface of the plurality of dimples have a differential surface property,
     wherein the external layer comprises a hydrophilic material,
     wherein the internal surface of each of the plurality of dimples comprises a superhydrophobic coating, and
     wherein each of the plurality of dimples is adapted to maintain an air bubble within, as one or more fluids flow over the vessel surface; and
   a pressure reservoir coupled with the plurality of dimples, wherein the pressure reservoir is configured to maintain an air-water interface over the plurality of dimples, and wherein the pressure reservoir includes an acoustic speaker configured to vibrate the air-water interface over the plurality of dimples.

2. The system of claim 1, wherein the external layer is substantially flat.

3. The system of claim 1, wherein each of the plurality of dimples has a hexagonal cross section.

4. The system of claim 1, wherein each of the plurality of dimples has a circular cross section.

5. The system of claim 1, wherein each of the plurality of dimples is coupled to the pressure reservoir by an air channel through which air and sound can be conducted.

6. The system of claim 1, wherein the acoustic speaker is further configured to output an acoustic wave at a predetermined signal frequency and a predetermined amplitude.

7. The system of claim 6, wherein the predetermined signal frequency is between 5 and 30 Hz.

8. The system of claim 6, wherein the predetermined signal frequency is approximately 20 Hz.

9. The system of claim 1, further comprising:
   control electronics comprising:
     one or more sensors;
     one or more processors;
     memory coupled to the one or more processors, wherein the memory is non-transitory and configured to store instructions that when executed by the one or more processors, cause the one or more processors to monitor the pressure in the pressure reservoir.

10. The system of claim 1, wherein the pressure reservoir is coupled with an air pump, and wherein the pressure reservoir is configured to replenish air to the plurality of dimples.

11. The system of claim 1, wherein the pressure reservoir is configured to maintain the air-water interface in a bulged configuration.

12. The system of claim 1, wherein the pressure reservoir is configured to maintain the air-water interface in a flat configuration.

13. The system of claim 1, wherein the pressure reservoir is configured to maintain the air-water interface in a sagged configuration.

14. The system of claim 1, wherein the superhydrophobic coating comprises at least one of a manganese oxide polystyrene nano-composite, a zinc oxide polystyrene nano-composite, a calcium carbonate, a carbon nano-tube structure, or a silica nano-coating.

* * * * *